United States Patent Office 3,264,280
Patented August 2, 1966

---

3,264,280
TRICOSAPEPTIDES AND INTERMEDIATES FOR THE PREPARATION THEREOF
Klaus H. Hofmann and Haruaki Yajima, Pittsburgh, Pa., assignors to the United States of America as represented by the Secretary of the Department of Health, Education, and Welfare
No Drawing. Filed Nov. 28, 1961, Ser. No. 155,476
3 Claims. (Cl. 260—112.5)

This invention relates to new biologically active polypeptides and to methods of making them.

We have found that the tricosapeptide seryltyrosylserylmethionylglutamylhistidylphenylalanyl-
arginyltryptophylglycyllysylprolylvalylglycyllysyllysyl-
arginylarginylprolylvalyllysylvalyltyrosine amide (I)

possesses essentially the full in vivo ascorbic acid depleting and plasma corticosterone elevating activity of corticotropin preparations derived from natural sources and is useful in therapy as a replacement for such preparations.

The protected tricosapeptide amide (II) is made by coupling by means of N,N′-dicyclohexylcarbodiimide the N$^\epsilon$-formyllysylprolylvalylglycyl-N$^\epsilon$-formyllsyl-N$^\epsilon$-formyl-phenylalanylarginyltryptophylglycine (III)

with the trihydrochloride of the tridecapeptide amide

N$^\epsilon$-formyllysylprolylvalylglycyl-N$^\epsilon$-formyllysyl-N$^\epsilon$-formyl-lysylarginylarginylprolylvalyl-N$^\epsilon$-formyllysylvalyl-tyrosyl amide (IV).

The resulting protected tricosapeptide amide (II) is converted to the tricosapeptide amide (I) by acid hydrolysis.

The tridecapeptide (IV) is obtained by hydrogenolysis of the carbobenzoxy derivative produced by coupling by the adide method N$^\alpha$-carbobenpoxy-N$^\epsilon$-formyllysylprolyl-valylglycyl-N$^\epsilon$-formyllysyl-N$^\epsilon$-formyllysine (V) with arginylarginylprolylvalyl-N$^\epsilon$-formyllysylvalyltyrosine amide (VI).

The acetyl decapeptide (III) is obtained by coupling acetylseryltyrosylserylmethionylglutamine azide (Hofmann et al., J.A.C.S. 82, 3732 (1960); Harris, Biochem. J. 71, 451 (1959)) with histidylphenylalanylarginyltryptophylglycine (Hofmann et al., J.A.C.S. 80, 1486 (1958)).

Illustrative examples of methods of making the compounds of the invention and characteristic properties of the compounds are given below. In all cases the amino acids and the amino acid residues, except glycine, in the peptides are the L-enantiomorphs.

PRODUCTION OF THE DECAPEPTIDE (III)

*Acetylseryltyrosylserylmethionylglutaminylhistidylphen-ylalanylarginyltryptophylglycine diacetate tetrahydrate.—*
Acetylseryltyrosylserylmethionylglutamine azide (0.136 g.) was added to an ice-cold solution of histidylphenyl-alanylarginyltryptophylglycine (0.119 g.) in freshly distilled dimethylformamide (6 ml.) containing triethylamine (0.021 ml.) and the mixture was kept at 0° for 48 hours. Freshly prepared azide (0.112 g.) was then added and the mixture was kept at 0° for an additional 48 hours. The mixture was filtered and the filtrate evaporated to dryness in vacuo (yield 0.36 g.). Analysis by paper chromatography revealed the presence of three Pauly positive materials with $R_f^1$ values of 0.52, 0.68 and 0.72, respectively. The $R_f^1$ 0.52 component was ninhy-

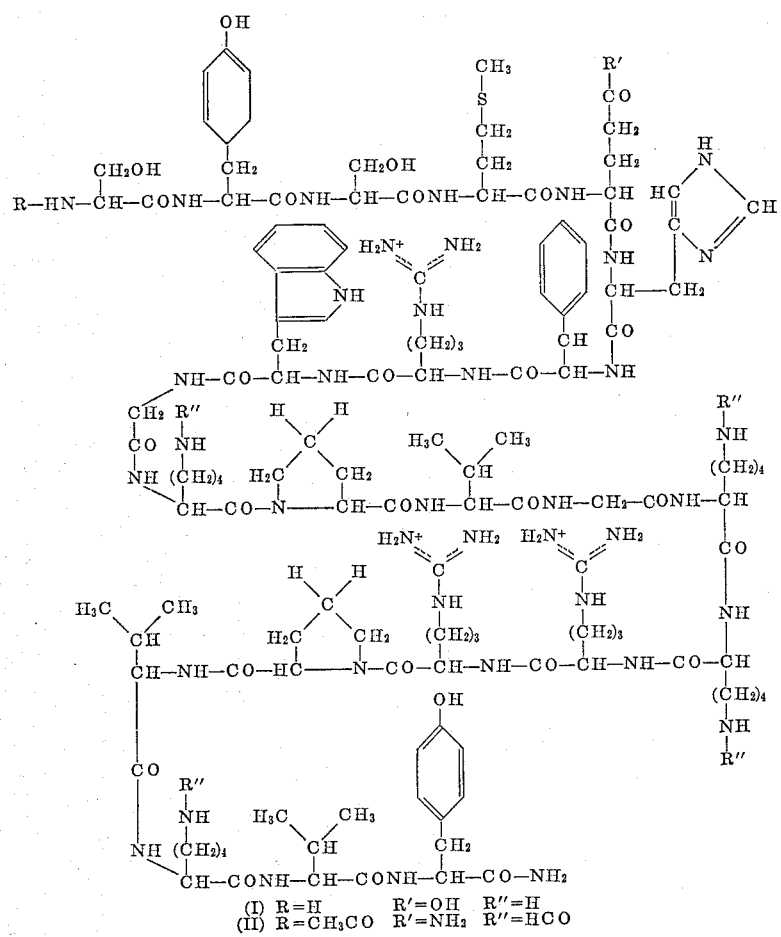

drin positive and its $R_f$ matched that of the pentapeptide component. The $R_f^1$ 0.72 component was methionine positive but failed to produce color with the Ehrlich and Sakaguchi reagents. The ninhydrin negative component ($R_f$ 0.68) reacted positively with the methionine, Ehrlich, Pauly and Sakaguchi reagents and represented the desired blocked decapeptide. The crude preparation was dissolved in 0.001 M, pH 5.5 ammonium acetate (60 ml.) and the solution was added to a (15 x 250 mm.) column prepared from carboxymethylcellulose which was equilibrated with the same buffer. The column then was eluted at room temperature with the following ammonium acetate buffers: 0.001 M, pH 5.5 (250 ml.); 0.005 M, pH 5.5 (200 ml.); 0.0075 M, pH 5.5 (200 ml); 0.01 M, pH 5.5 (450 ml.); 0.05 M, pH 5.9 (180 ml.); and finally 0.1 M, pH 6.5 (180 ml.). Individual fractions (9 ml. each) were collected in an automatic fraction collector at a flow rate of 3 ml. per minute. Absorbency at 280 m$\mu$ served to locate the peptides in the various chromatographic fractions. The desired blocked peptide was located in tubes 87–147 (0.01 M buffer eluates). The contents of these tubes were pooled and lyophilized. Ammonium acetate was removed by repeated lyophilization from dilute acetic acid and the product was dried to constant weight over phosphorus pentoxide in vacuo; colorless fluffy powder, yield 118 mg., $[\alpha]_D^{27}$ —30.6° (c. 0.5 in 10% acetic acid), $R_2^1$ 0.68; single ninhydrin negative, Pauly, methionine, Sakaguchi and Ehrlich positive spot; $\lambda_{max}$ 280 m$\mu$, log $\epsilon$ 3.785 (in 10% acetic acid); amino acid composition of acid hydrolysate $ser_{2.05}$-$tyr_{0.99}met_{1.00}glu_{0.99}his_{1.00}phe_{1.04}arg_{1.00}gly_{1.00}$; melanocyte-expanding activity in vitro $3.6 \times 10^6$ MSH units/g.

*Analysis.*—Calculated for $C_{65}H_{89}O_{20}N_{17}S \cdot 4H_2O$: C, 50.9; H, 6.4; N, 15.5. Found: C, 51.6; H, 6.5; N, 15.0.

*Seryltyrosylserylmethionylglutamylhistidylphenylalanylarginyltryptophylglycine.*—The acetyl decapeptide (50 mg.) was dissolved in 0.5 N hydrochloric acid (4 ml.) and the solution was heated in a sealed tube in a boiling water-bath for 70 minutes. The solution was cooled, diluted with water (16 ml.) and Amberlite IRA–400 (acetate cycle) was added with stirring until the supernatant was free of chloride ions (amount required approximately 6 g.). The resin was removed by filtration, was washed with four 15-ml. portions of water and the combined filtrate and washings were concentrated to a small volume in vacuo and the residue was lyophilized. The ensuing powder was dissolved in 0.001 M, pH 5.5 ammonium acetate buffer (7 ml.) and the solution was added to a (10 x 200 mm.) column prepared from 7 g. of carboxymethylcellulose and previously equilibrated with the same buffer. The column then was eluted at room temperature with the following ammonium acetate buffers: 0.001 M, pH 5.5 (120 ml.); 0.005 M, pH 5.5 (120 ml.); 0.01 M, pH 5.5 (120 ml.); 0.025 M, pH 5.7 (240 ml.); 0.05 M, pH 5.9 (120 ml.); 0.1 M, pH 6.5 (120 ml.); and finally 0.25 M, pH 6.9 (120 ml.). Individual fractions (6 ml. each) were collected with the aid of an automatic fraction collector set at a flow rate of 2 ml. per minute. Absorbency at 280 m$\mu$ served to locate the peptides in the various chromatographic fractions. The desired peptide was located in tubes 78–100 (0.025 M ammonium acetate eluates). The contents of these tubes was pooled and lyophilized. The residue (30 mg.) on paper chromatography showed the presence of one major component ($R_f^1$ 0.51) and a minor component ($R_f^1$ 0.41). For further purification the material was redissolved in 0.001 M ammonium acetate buffer and applied to a CMC column (10 x 130 mm.) which was eluted in the manner described above with the following ammonium acetate buffers: 0.001 M, pH 5.5 (100 ml.); 0.01 M, pH 5.5 (120 ml.); 0.017 M, pH 5.6 (300 ml.). Absorbency at 280 m$\mu$ served to locate the peptides in the various chromatographic fractions. The contents of tubes 56–73 (0.017 M ammonium acetate eluates) which contained the desired material were pooled. The peptide was isolated and freed of ammonium acetate by lyophilization in the usual manner; yield 21 mg., $[\alpha]_D^{27}$ —29.2° (c. 0.4 in 5% acetic acid), $R_f^1$ 0.51; single ninhydrin, Pauly, methionine, Sakaguchi and Ehrlich positive spot; $R_f^2$ pro; $\lambda_{max}$ 280 m$\mu$, log $\epsilon$ 3.773 (in 10% acetic acid); amino acid composition of acid hydrolysate $ser_{1.95}tyr_{0.93}$-$met_{1.00}glu_{1.02}his_{1.07}phe_{1.07}arg_{0.91}gly_{1.04}$; amino acid composition of LAP digest (paper chromatography) $ser_{1.9}$-$tyr_{1.0}met_{1.0}glu_{0.9}his_{1.0}phe_{1.0}arg_{1.1}try_{1.0}gly_{1.0}$; melanocyte-expanding activity in vitro $2.9 \times 10^6$ MSH units/g.

PRODUCTION OF THE TRIDECAPEPTIDE (IV)

A. *Production of the hexapeptide (V)*

$N^\epsilon$-*formyllysyl*-$N^\epsilon$-*formyllysine methyl ester hydrochloride.*—The carboxybenzoxy derivative (Hofmann et al., J.A.C.S. 82, 3727 (1960)) (5.0 g.) was dissolved in methanol (70 ml.) containing 50% aqueous acetic acid (1.5 ml.) and the solution was shaken in presence of a palladium catalyst in a stream of hydrogen until the evolution of carbon dioxide had ceased. The catalyst was removed by filtration, the solvent was evaporated and the resulting sirup dissolved in methanol (15 ml.) The solution was cooled in an ice-salt-bath and concentrated hydrochloric acid (1.1 ml.) was added with stirring. The oily product was prepicipated with ether, was washed by decantation with several portions of ether and was dried over phosphorus pentoxide in vacuo; highly hygroscopic white solid, yield 3.8 g. (95%), ninhydrin positive single spot, $R_f$ 0.54.

$N^\alpha$ - *carbobenzoxy* - $N^\epsilon$ - *formyllysylprolylvalylglycycl*-$N^\epsilon$ - *formyllysyl* - $N^\epsilon$ - *formyllysine methyl ester.*—$N,N^\epsilon$-carbonyldiimidazole (0.51 g.) was added to a solution of $N^\alpha$ - carbobenzoxy - $N^\epsilon$ - formyllysylprolylvalylglycine (Hofmann et al. J.A.C.S. 82, 3727 (1960)) (1.76 g.) in ice-cold dimethylformamide (30 ml.) and the solution was stirred with ice cooling until the evolution of carbon dioxide ceased. A solution of $N^\epsilon$-formyllysyl-$N^\epsilon$-formyllysine methyl ester obtained by evaporating a solution of the hydrochloride (1.15 g.) in methanol (15 ml.) and triethylamine (0.43 ml.) and dissolving the residue in dimethylformamide (25 ml.) was then added and the mixture was kept at room temperature for 4 hours. The solvent was removed in vacuo, the residue was dissolved in 1-butanol (equilibrated with 2% acetic acid) and the solution was washed consecutively with six 20-ml. portions of 2% acetic acid, six 20-ml. portions of 3% ammonium hydroxide and seven 30-ml. portions of water (equilibrated with 1-butanol). Emulsions were broken by centrifugation. Evaporation of the butanol phase gave a solid residue (2.21 g.), M.P. 116–121°, which was dissolved in hot ethanol (10 ml.). The solution was cooled at room temperature, ethyl acetate (5 ml.) was added and the mixture was placed in a refrigerator. The resulting gelatinous product was collected, washed with a mixture of ethanol and ethyl acetate and finally with ethyl acetate and was dried to constant weight in vacuo over phosphorus pentoxide at room temperature; amorphous solid, yield 1.96 g. (70%), M.P. 127–130°, $[\alpha]_D^{28}$ —64.0° (c. 1.33 in methanol); amino acid ratios in acid hydrolysate $lys_{3.00}pro_{1.00}val_{1.00}gly_{1.00}$ (94%).

*Analysis.*—Calcd. for $C_{42}H_{65}O_{12}N_9 \cdot H_2O$: C, 55.7; H, 7.5; N, 13.9. Found C, 55.5; H, 7.5; N, 14.2.

$N^\alpha$ - *carbobenzoxy* - $N^\epsilon$ - *formyllysylprolylvalylglycyl*-$N^\epsilon$ - *formyllysyl* - $N^\epsilon$ - *formyllysine hydrate.*—The carbobenzoxy methyl ester (0.89 g.) was dissolved in methanol (10 ml.), 1 N sodium hydroxide (2 ml.) was added and the solution was kept at room temperature for 3 hours. The bulk of the methanol was removed in vacuo and water (10 ml.) was added. The mixture was cooled in an ice-bath, acidified to Congo red with 2 N hydrochloric acid and extracted with 1-butanol (previously equilibrated with water). The butanol extracts were combined, extracted with several 30-ml. portions of water until the washings were free of chloride ions, and the butanol was evaporated. The residue was dissolved in ethanol (10 ml.), ethyl acetate (20 ml.) was added and the mixture was placed in a refrigerator for 12 hours. The resulting gelatinous precipitate was collected, washed with a 1:2 v./v. mixture of ethanol and ethyl acetate and dried; amorphous solid, yield 0.73 g. (82%), M.P. 118–125°, $[\alpha]_D^{28}$ −56.5° (c. 1.47 in methanol), ninhydrin negative; amino acid ratios in acid hydrolysate $lys_{3.06}pro_{1.00}gly_{1.00}val_{0.97}$ (91%).

Analysis.—Calcd. for $C_{41}H_{63}O_{12}N_9 \cdot H_2O$: C, 55.2; H, 7.3; N, 14.1. Found: C, 54.8; H, 7.3; N, 14.3.

$N^\epsilon$-formyllysylprolylvalylglycyl-$N^\epsilon$-formyllysyl-$N^\epsilon$-formyllysine trihydrate.—The carbobenzoxy peptide (0.17 g.) was hydrogenated in methanol (20 ml.) containing glacial acetic acid (0.01 ml.) in the usual manner. The product was purified by precipitation from 5 ml. of ethanol with ethyl acetate; hydroscopic powder, yield 0.11 g. (73%), $[\alpha]_D^{28}$ −41.1° (c. 0.69 in methanol), $R_f$ 0.46, sharp single spot ninhydrin positive; $R_f$ $N^\epsilon$-formyl[26]; amino acid ratios in LAP digest $N^\epsilon$-formyl$_{3.00}$pro$_{1.01}$val$_{1.01}$gly$_{0.99}$ (95%).

Analysis.—Calcd. for $C_{33}H_{57}O_{10}N_9 \cdot 3H_2O$: N, 15.9. Found: N, 15.6.

$N^\alpha$-carbobenzoxy-$N^\epsilon$-formyllysylprolylvalylglycyl-$N^\epsilon$-formyllysyl-$N^\epsilon$ formyllysine hydrazide.—Hydrazine hydrate (0.28 ml.) was added to a solution of the carbobenzoxy hexapeptide methyl ester (1.33 g.) in methanol (15 ml.) and the solution was kept in a refrigerator at 5° for 3 days. Ether (approximately 2 ml.) was added and the mixture placed in a refrigerator for 24 hours. The resulting gelatinous precipitate was collected and dried in vacuo over sulfuric acid; yield 0.93 g. (70%), M.P. 145–153°. A sample for analysis was dissolved in hot methanol and the solution placed in a refrigerator for 12 hours. The gelatinous product was collected and dried; M.P. 151–154°. For evaluation of stereochemical homogeneity a sample of the carbobenzoxy hydrazide was hydrogenated over palladium in methanol containing 50% acetic acid and the deblocked material was subjected to digestion with LAP; amino acid ratios in digest $N^\epsilon$-formyl$_{2.90}$pro$_{1.13}$val$_{1.05}$gly$_{0.96}$ (75%).

Analysis.—Calcd. for $C_{41}H_{65}O_{11}N_{11}$: N, 17.3. Found: N, 17.0.

B. Production of the heptapeptide (VI)

Carbobenzoxyvalyltyrosine amide hydrate.—Carbobenzoxyvalyltyrosine methyl ester (Rittel et al., Helv. Chim. Acta 40, 614 (1957)) (7.0 g.) was dissolved in methanol (100 ml.) and the solution was cooled with Dry Ice-acetone. A slow stream of dry ammonia was passed into the solution for 5 minutes and the mixture was kept at room temperature for 48 hours. The resulting precipitate was collected and recrystallized from a mixture of methanol and water; yield 5.09 g. (73%), M.P. 199–200°, $[\alpha]_D^{27}$ −19.3° (c. 0.23 in dimethylformamide).

Analysis.—Calcd. for $C_{22}H_{27}O_5N_3 \cdot H_2O$: C, 61.2; H, 6.9; N, 9.7. Found: C, 61.9; H, 6.9; N, 9.5.

Valyltyrosine amide acetate trihydrate.—Carbobenzoxyvalyltyrosine amide (5.42 g.) was suspended in methanol (300 ml.) containing 10% aqueous acetic acid (10 ml.) and the mixture was shaken with hydrogen in the presence of a palladium catalyst until evolution of carbon dioxide ceased. The catalyst was removed by filtration and the filtrate evaporated in vacuo. The resulting oil soon crystallized and the compound was purified by recrystallization from a mixture of ethanol and water; yield 4.0 g. (81%), M.P. 239–241°, $[\alpha]_D^{29}$ +23.6° (c. 0.22 in methanol), $R_f$ 0.63.

Analysis.—Calcd. for $C_{16}H_{25}O_5N_3 \cdot 3H_2O$: C, 48.8; H, 7.9; N, 10.7. Found: C, 48.5; H, 7.1; N, 10.6.

$N^\alpha$-carbobenzoxy-$N^\epsilon$-formyllysylvalyltyrosine amide.—A mixed anhydride was prepared in the usual manner from $N^\alpha$-carbobenzoxy-$N^\epsilon$-formyllysine (Rittel et al., Helv. Chim. Acta 40, 614 (1957)) (3.0 g.) in freezing dioxane (30 ml.) with tri-n-butylamine (2.31 ml.) and ethyl chloroformate (0.97 ml.) and this solution was added with stirring to a cold (5°) solution of valyltyrosine amide acetate trihydrate (3.15 g.) and triethylamine (1.35 ml.) in dimethylformamide (20 ml.). Hhe mixture was stirred for 30 minutes with cooling in an ice bath and 2 hours at room temperature. A white solid precipitated as the reaction proceeded. Ether (200 ml.) was added to the suspension and the precipitate was collected. The material was washed by decantation first with three 30-ml. portions of ice-cold 1% acetic acid, then with three 30-ml. portions of 1% ammonium hydroxide and finally with several portions of water and was dried in vacuo over phosphorus pentoxide; yield 3.71 g. (60%), M.P. 249–251°, $[\alpha]_D^{25}$ −10.9° (c. 0.60 in dimethylformamide).

Analysis.—Calcd. for $C_{29}H_{39}O_7N_5$: C, 61.1; H, 6.9; N, 12.3. Found: C, 60.8; H, 6.9; N, 12.4.

$N^\epsilon$-formyllysylvalyltryrosine amide acetate.—$N^\alpha$-carbobenzoxy-$N^\epsilon$-formyllysylvalyltyrosine amide (3.6 g.) was suspended in methanol (100 ml.) containing 1% v./v. of glacial acetic acid and the suspension was shaken in an atmosphere of hydrogen over a palladium catalyst until the evolution of carbon dioxide had ceased. The catalyst was removed by filtration and the solvent was removed in vacuo. The residue was dissolved in ethanol (20 ml.), the solution was concentrated to a volume of 5 ml. in vacuo and the product was precipitated with ether. The white solid was collected and recrystallized from a mixture of ethanol and water; yield 2.6 g. (82%), M.P. 168–169°, $[\alpha]_D^{29}$ −8.9° (c. 0.10 in methanol), $R_f$ 0.63, single ninhydrin positive, tyrosine positive spot; amino acid ratios in LAP digest, $N^\epsilon$-formyl$lys_{1.01}val_{1.02}tyr_{0.99}$ (92%).

Analysis.—Calcd. for $C_{23}H_{37}O_7N_5$: C, 55.7; H, 7.5; N, 14.1. Found: C, 55.5; H, 7.6; N, 14.3.

Carbobenzoxyvalyl-$N^\epsilon$-formyllysylvalyltyrosine amide.—A mixed anhydride was prepared in the usual manner from carbobenzoxyvaline (Vaughan et al., J.A.C.S. 75, 5556 (1953)) (0.55 g.) in freezing dioxane (10 ml.) with tri-n-butylamine (0.53 ml.) and ethyl chloroformate (0.22 ml.). This solution was added to an ice-cold solution of $N^\epsilon$-formyllysylvalyltyrosine amide acetate (0.99 g.) in dimethylformamide (10 ml.) and triethylamine (0.27 ml.). The mixture was stirred at ice-bath temperature for 30 minutes and at room temperature for 2 hours and ether (100 ml.) was added. The resulting precipitate was collected and washed by decantation with three 20-ml. portions of 1% acetic acid, there 20-ml. portions of 1% ammonium hydroxide and finally with several portions of water. The product was dried over phosphorus pentoxide in vacuo; yield 1.07 g. (80%), M.P. 251–253°, $[\alpha]_D^{26}$ −19.6° (c. 0.56 in dimethylformamide).

Analysis.—Calcd. for $C_{34}H_{48}O_8N_6$: C, 61.0; H, 7.2; N, 12.6. Found: C, 60.4; H, 7.6; N, 12.8.

Valyl-$N^\epsilon$-formyllysylvalyltyrosine amide acetate one and one half hydrate.—The carbobenzoxytetrapeptide (6.35 g.) was hydrogenated over palladium in methanol (400 ml.) containing 1% v./v. of glacial acetic acid and the partial deblocked compound was isolated in the usual manner. For purification the compound was dissolved in water and was obtained in crystalline form by addition of ethanol, yield 5.05 g. (86%), $[\alpha]_D^{29}$ −30.2° (c. 0.52 in 10% acetic acid), $R_f$ 0.61; amino acid ratios in acid hydrolysate $lys_{1.00}val_{2.00}tyr_{1.00}$ (89%); amino acid ratios in LAP digest $N^\epsilon$-formyl$lys_{0.97}val_{1.97}tyr_{1.00}$ (86%).

Analysis.—Calcd. for $C_{28}H_{46}O_8N_6 \cdot 1.5H_2O$: C, 54.1; H, 7.9; N, 13.5. Found: C, 53.6; H, 7.8; N, 13.6.

Carbobenzoxyprolylvalyl-$N^\epsilon$-formyllysylvalyltyrosine amide half hydrate.—A mixed anhydride was prepared in the usual manner from carbobenzoxypyroline (Roeske et al., J.A.C.S. 78, 5883 (1956)) (1.37 g.) in freezing dioxane (10 ml.) with tri-n-butylamine (1.31 ml.) and ethyl chloroformate (0.53 ml.). This solution was added with stirring to an ice-cold solution of valyl-$N^\epsilon$-formyllysylvalyltyrosine amide acetate (2.8 g.) in 90% v./v.

aqueous dimethylformamide (15 ml.) and triethylamine (0.65 ml.). The mixture was stirred at ice-bath temperature for 30 minutes and at room temperature for 2 hours. Ether (200 ml.) then was added and the precipitate was collected and dried over phosphorus pentoxide in vacuo; yield 3.24 g. (88%), M.P. 258–264°, $[\alpha]_D^{27}$ −33.1° (c. 2.74 in dimethylformamide), $R_f$ 0.92, ninhydrin negative, tyrosine positive.

*Analysis.*—Calcd. for $C_{39}H_{55}O_9N_7 \cdot 0.5H_2O$: C, 60.5; H, 7.3; N, 12.6. Found: C, 60.4; H, 7.4; N, 12.8.

*Prolylvalyl-$N^\epsilon$-formyllysylvalyltyrosine amide acetate monohydrate.*—The carbobenzoxypentapeptide (5.37 g.) was hydrogenated in 90% aqueous methanol containing 1% of glacial acetic acid until the evolution of carbon dioxide came to an end. The catalyst was removed by filtration and the filtrate was evaporated to dryness in vacuo. Ether was added to the residue and the white solid was collected and dried. This material was dissolved in 10% acetic acid (approximately 40 ml.) and the solution was extracted with three 30-ml. portions of 1-butanol. The butanol layers were in turn washed with two 30-ml. portions of 10% acetic acid and the combined aqueous phases were concentrated in vacuo to a volume of approximately 10 ml. and lyophilized; yield 3.77 g. (81%), $[\alpha]_D^{30}$ −68.8° (c. 0.37 in 10% acetic acid), $R_f$ 0.61; amino acid ratios in acid hydrolysate $pro_{1.00}val_{1.99}lys_{1.00}tyr_{1.02}$ (91%); amino acid ratios in LAP digest $pro_{1.03}val_{1.99}N^\epsilon$-formyl$_{0.99}tyr_{1.03}$ (85%).

*Analysis.*—Calcd. for $C_{33}H_{54}O_9N_7 \cdot H_2O$: C, 55.8; H, 7.9; N, 14.0. Found: C, 55.4; H, 7.8; N, 14.8.

*Carbobenzoxynitroarginylprolylvalyl - $N^\epsilon$ - formyllysylvalyltyrosine amide.*—A mixed anhydride was prepared in the usual manner from carbobenzoxynitroarginine (0.805 g.) in ice-cold tetrahydrofuran (10 ml.) with tri-n-butylamine (0.54 ml.) and ethyl chloroformate (0.22 ml.). This solution was added to a chilled 10% aqueous dimethylformamide solution (20 ml.) containing prolylvalyl-N-formyllysylvalyltyrosine amide acetate (1.24 g.) and triethylamine (0.262 ml.). The mixture was stirred at 0° for 30 minutes and at room temperature for 2 hours. Ether (100 ml.) was then added and the colorless precipitate was collected and washed by decantation with three 50 ml. portions of 1% acetic acid, three 50-ml. portions of 1% ammonium hydroxide and finally with water. The material then was dried over phosphorus pentoxide in vacuo; yield 1.21 g. (67%), M.P. 220–224°, $[\alpha]_D^{27}$ −37.6° (c. 0.37 in dimethylformamide).

*Analysis.*—Calcd. for $C_{45}H_{66}O_{12}N_{12}$: C, 55.9; H, 6.9; N, 17.4. Found: C, 56.1; H, 7.4; N, 15.6.

*Arginylprolylvalyl - $N^\epsilon$-formyllysylvalyltyrosine amide diacetate hydrate.*—The carbobenzoxyhexapeptide (500 mg.) was hydrogenated over a palladium catalyst for 12 hours in 90% aqueous methanol (200 ml.) containing 1% of acetic acid. The catalyst was removed by filtration, the filtrate was evaporated to dryness in vacuo and the residue was dissolved in water (30 ml.). The solution was extracted with three 20-ml. portions of ethyl acetate and the aqueous layers were concentrated to a small volume in vacuo and finally lyophilized; yield 388 mg. (75%).

*a. Purification by countercurrent distribution.*—The crude partially blocked hexapeptide (540 mg.) was dissolved in 5% acetic acid equilibrated with 1-butanol and this solution was added to the first three tubes of a countercurrent machine and 450 transfers were carried out in the solvent system 1-butanol-5% acetic acid. Evaluation of the absorbency at 275 mμ of the lower phases showed the presence of two peaks, the major one being located in tubes 1 to 45, the minor one occupying tubes 45 to 85. The contents of tubes 5 to 37 were combined, concentrated to a small volume in vacuo and finally lyophilized; yield 382 mg. (71%), M.P. 250–255°, $[\alpha]_D^{29}$ −76.4° (c. 0.51 in 10% acetic acid) $R_f$ 0.47; single ninhydrin, Sakaguchi and tyrosine positive spot; amino acid ratios in acid hydrolysate $arg_{1.00}pro_{1.03}val_{2.00}lys_{1.00}tyr_{0.85}$ (84%); amino acid ratios in LAP digest $arg_{0.93}pro_{0.98}val_{2.00}N^\epsilon$-formyl$_{0.99}tyr_{1.03}$ (84%).

*Analysis.*—Calcd. for $C_{41}H_{69}O_{12}N_{11} \cdot H_2O$: C, 53.2; H, 7.7; N, 16.6; acetyl, 9.3. Found: 53.3; H, 8.0; N, 16.5; acetyl, 9.4.

*b. Purification by CMC chromatography.*—The crude partially protected hexapeptide (388 mg.) was dissolved in water (5 ml.), the solution was added to a CMC column (3.0 x 10.0 cm.), which was eluted successively with the following ammonium acetate solutions: 0.005 M, pH 5.5 (250 ml.); 0.01 M, pH 5.7 (150 ml.); 0.05 M, pH 5.9 (500 ml.); and 0.075 M, 6.3 (800 ml.). Individual fractions, 10 ml. each, were collected at a flow rate of 3 to 4 ml. per minute with an automatic fraction collector and the absorbency at 275 mμ of each fraction was determined. The hexapeptide was present in the 0.075 M eluates which were combined, concentrated to a small volume in vacuo and lyophilized. Ammonium acetate was removed by repeated lyophilization to constant weight; yield 306 mg. (79%), $[\alpha]_D^{27}$ −77.5° (c. 0.17 in acetic acid), $R_f$ 0.47; single ninhydrin, Sakaguchi and tyrosine positive spot; amino acid ratios in acid hydrolysate $arg_{0.91}pro_{1.07}val_{2.03}lys_{1.04}tyr_{0.98}$ (94%); amino acid ratios in LAP digest $arg_{0.93}pro_{1.03}val_{2.03}N^\epsilon$-formyl$_{1.00}tyr_{1.01}$ (96%).

*Carbobenzoxynitroarginylarginylprolylvalyl - $N^\epsilon$-formyllysylvalyltyrosine amide acetate trihydrate.*—A mixed anhyrdide was prepared in the usual manner from carbobenzoxynitroarginine (0.69 g.) in ice-cold tetrahydrofuran (10 ml.) with tri-n-butylamine (0.47 ml.) and ethyl chloroformate (0.19 ml). This solution was added to an ice-cold solution of arginylprolylvalyl-$N^\epsilon$-formyllysylvalyltyrosine amide (1.36 g) in 90% aqueous tetrahydrofuran and triethylamine (0.21 ml.). The mixture was kept at 0° for 30 minutes and at room temperature for 2 hours and ether (100 ml.) was added to precipitate the crude reaction product. The precipitate was dissolved in 20% acetic acid (30 ml.) and the solution was extracted with five 20-ml. portions of ethyl acetate. The ethyl acetate layers were in turn extracted with four 20-ml. portions of 20% acetic acid and the aqueous phases were combined and concentrated to a small volume in vacuo; the residue was lyophilized and dried in vacuo at room temperature over phosphorus pentoxide; yield 1.63 g. (85%), M.P. 204–207°, $[\alpha]_D^{28}$ −72.8° (c. 0.38 in 10% acetic acid), $R_f$ 0.89.

*Analysis.*—Calcd. for $C_{53}H_{82}O_{15}N_{16} \cdot 3H_2O$: C, 51.4; H, 7.2; N, 18.1. Found: C, 51.7; H, 7.5; N, 17.0.

*Arginylarginylprolylvalyl - $N^\epsilon$ - formyllysylvalyltyrosine amide triacetate octahydrate.*—The above carbobenzoxyheptapeptide amide (348 mg.) was hydrogenated over a palladium for 12 hours in 10% aqueous acetic acid (10 ml.) and the catalyst was removed by filtration. The filtrate was concentrated to a small volume in vacuo and was finally lyophilized; yield 310 mg. (82%). The crude material pooled from two experiments (512 mg.) was dissolved in water (5 ml.), the solution added to a CMC column (3.0 x 12.0 cm.) which was eluted successively with the following ammonium acetate solutions: 0.005 M, pH 5.5 (100 ml.); 0.01 M, pH 5.5 (100 ml.); 0.05 M, ph 5.9 (300 ml.); 0.075 M, pH 6.3 (300 ml.); and 0.15 M, pH 6.7 (1000 ml.). Individual fractions, 10 ml. each, were collected at a flow rate of 3 to 4 ml. per minute with an automatic fraction collector and the absorbency of each fraction was determined at 275 mμ. The heptapeptide was present in the 0.15 M eluates which were combined, concentrated to a small volume in vacuo and lyophilized. Ammonium acetate was removed by repeated lyophilization to constant weight; fluffy colorless powder, yield 408 mg. (80%), $[\alpha]_D^{29}$ −73.6° (c. 0.26 in 10% acetic acid), $R_f$ 0.37; sharp single spot ninhydrin, Sakaguchi and tyrosine positive; amino acid ratios in acid hydrolysate $arg_{2.00}pro_{1.04}val_{2.05}lys_{1.00}tyr_{0.95}$ (95%) amino acid ratios in LAP digest $arg_{2.01}pro_{0.98}val_{2.01}N^{\epsilon}\text{-formyl}_{0.98}tyr_{0.98}$ (88%).

*Analysis.*—Calcd. for $C_{49}H_{84}O_{15}N_{15} \cdot 8H_2O$: C, 46.64; H, 7.9; N, 16.6. Found: C, 46.9; H, 7.6; N, 16.2.

C. Condensation of the hexapeptide and heptapeptide $N^{\epsilon}$-carbobenzoxy - $N^{\epsilon}$ - formyllysylprolylvalylglycyl-$N^{\epsilon}$-formyllysyl - $N^{\epsilon}$ - formyllysylarginylarginylprolylvalyl-$N^{\epsilon}$-formyllysylvalyltyrosine amide diacetate tetrahydrate.— This entire operation was carried out in a cold room and solutions were ice-cold prior to their use. To a solution of $N^{\alpha}$-carbobenzoxy - $N^{\epsilon}$ - formyllysylprolylvalylglycyl-N-formyllysyl-$N^{\epsilon}$-formyllysine (264 mg.) in 90% aqueous tetrahydrofuran (2 ml.), there was added 1 N hydrochloric acid (0.6 ml.) followed by a solution of sodium nitrite (21 mg.) in water (0.5 ml.) and the mixture was kept in an ice-bath for 10 minutes. The pH was then adjusted to 7.0 by addition of 10% v./v. triethylamine in 90% tetrahydrofuran and this solution which contained the azide was added to a solution of arginylarginylprolylvalyl-$N^{\epsilon}$-formyllysylvalyltyrosine amide triacetate octahydrate (288 mg.) in freshly distilled dimethylformamide (4.5 ml.) and 10% v./v. triethylamine in 90% aqueous tetrahydrofuran (0.35 ml.). The mixture was kept at 5° for 24 hours, a second portion of azide solution, prepared in the manner described above, then was added and the mixture was kept at 5° for 48 hours. The solvents were removed in vacuo, the residue was dissolved in water (400 ml.) and the solution was added to a (3.00 x 20.0 cm.) CMC column which was eluted successively with the following pH 6.9 ammonium acetate solutions: 0.001 M (200 ml.), 0.025 M (600 ml.), 0.05 M (650 ml.), 0.1 M (200 ml.) and 0.15 M (650 ml.). Individual fractions of 10 ml. each were collected at a flow rate of 3 to 4 ml. per minute with an automatic fraction collector and the absorbency of each fraction was determined at 275 mμ. The 0.05 M ammonium acetate eluates (tubes 141–181) containing the blocked tridecapeptide amide diacetate were pooled, concentrated to a small volume in vacuo and lyophilized. Ammonium acetate was removed by repeated lyophilization to constant weight; colorless fluffy material, yield 330 mg. (73%), $[\alpha]_D^{23}$ −87.1° (c. 0.25 in 10% acetic acid); sharp single spot ninhydrin negative, Sakaguchi and Pauly positive; $R_f$ 0.67; amino acid ratios in acid hydrolysate $lys_{4.00}pro_{2.08}val_{3.00}gly_{1.04}arg_{1.80}tyr_{0.68}$ (90%).

*Analysis.*—Calcd. for $C_{88}H_{142}O_{24}N_{24} \cdot 4H_2O$: C, 53.1; H, 7.6; N, 17.0. Found: C, 53.0; H, 7.8; N, 17.5.

The $N^{\epsilon}$-formyllysylprolylvalylglycyl-$N^{\epsilon}$-formyllysyl-$N^{\epsilon}$-formyllysylarginylarginylprolylvalyl - $N^{\epsilon}$ - formyllysylvalyl-tyrosine amide triacetate hexahydrate (IV).—The carbobenzoxy derivative (125 mg.) from the azide coupling was hydrogenated in the usual manner over palladium in 1% acetic acid (20 ml.) for 3 hours. The catalyst was removed by filtration and the clear filtrate was lyophilized; colorless fluffy powder, yield 120 mg. Paper chromatography showed the presence of one major component ($R_f$ 0.40) and two faint impurities with $R_f$ values of 0.32 and 0.47, respectively. For purification, this product (110 mg.) was dissolved in 0.05 M ammonium acetate buffer (20 ml.) and the solution was applied to a CMC column (1.5 x 20.0 cm.) which was eluted successively with these pH 6.5 ammonium acetate buffers: 0.05 M (100 ml.), 0.075 M (10 ml.), 0.10 M (150 ml.) and 0.12 M (150 ml.). Individual fractions (10 ml. each) were collected with an automatic fraction collector at a flow rate of 3 to 4 ml. per minute and absorbency at 275 mμ. was determined for each fraction. The desired material was present in the 0.10 M eluates (tubes 21–29) which were pooled, evaporated to a small volume and lyophilized to constant weight: fluffy colorless powder, yield 91 mg. (74%), $[\alpha]_D^{28}$ −90.0° (c. 0.3 in 10% acetic acid); sharp single spot ninhydrin, Sakaguchi and Pauly positive; $R_f$ 0.40; amino acid ratios in acid hydrolysate $lys_{3.89}pro_{2.04}val_{2.98}gly_{1.02}arg_{1.87}tyr_{0.93}$ (98%); amino acid ratios in LAP digest $N^{\epsilon}\text{-formyl}_{4.22}pro_{2.11}val_{2.97}gly_{0.97}arg_{1.78}tyr_{0.86}$ (77%); amino acid ratios in trypsin plus LAP digest $N^{\epsilon}\text{-formyl}_{3.83}pro_{2.05}val_{3.08}gly_{1.00}arg_{2.02}tyr_{1.00}$ (84%).

*Analysis.*—Calcd. for $C_{82}H_{140}O_{24}N_{24} \cdot 6H_2O$: C, 50.7; H, 7.3; N, 17.3. Found: C, 50.2; H, 7.9; N, 17.3.

PRODUCTION OF THE TRICOSAPEPTIDE (I)

Acetylseryltyrosylserylmethionylglutaminylhistidylphenylalanylarginyltryptophylglycine dihydrochloride octahydrate.—Acetylseryltyrosylserylmethionylglutaminylhistidylphenylalanylarginyltryptophylglycine (III) (600 mg.) was dissolved in 0.2 N hydrochloric acid (10 ml. with warming at 50° and the solution was lyophilized; yield quantitative.

*Analysis.*—Calcd. for $C_{61}H_{83}O_{16}N_{17}S\ Cl_2 \cdot 8H_2O$: C, 47.0; H, 6.3; N, 15.3. Found: C, 47.5; H, 6.5; N, 14.9.

$N^{\epsilon}$ - Formyllysylprolylvalylglycyl - $N^{\epsilon}$ - formyllysyl - $N^{\epsilon}$ formyllysylarginylarginylprolylvalyl - $N^{\epsilon}$-formyllysylalyltyrosine amide trihydrochloride trihydrate.—$N^{\epsilon}$ - formyllyslyprolylvalylglycyl - N - formyllysyl - $N^{\epsilon}$ - formyllysyl-arginylarginylprolylvalyl - $N^{\epsilon}$ - formyllysylvalyltyrosine amide triacetate (IV) (553 mg.), carefully dried in vacuo, was dissolved in ice-water (4 ml.). Under ice-cooling, 0.9 ml. of 1 N hydrochloric acid was added and the solution was lyophilized; yield 522 mg.

*Analysis.*—Calcd. for $C_{76}H_{128}O_{18}N_{24} \cdot 3HCl \cdot 3H_2O$: C, 49.9; H, 7.6; N, 18.4. Found: C, 49.9; H, 8.1; N, 18.3.

Acetylseryltyrosylserylmethionylglutaminylhistidylphenylalanylarginyltryptophylglycyl - $N^{\epsilon}$ - formyllysylprolylvalylglycyl-$N^{\epsilon}$ - formyllysyl - $N^{\epsilon}$ - formyllysylarginylarginylprolylvalyl - $N^{\epsilon}$ - formyllysylvalyltyrosine amide triacetate octahydrate (II).—To a dimethylformamide solution (10 ml.) containing the hydrochlorides of (III) (551 mg.) and (IV) (522 mg.) 0.95 ml. of a 10% solution of triethylamine in dimethylformamide was added followed by N,N'dicyclohexylcarbodiimide (DCC) (180 mg.) and the mixture was kept at room temperature with stirring for 24 hours. An additional quantity of DCC (100 mg.) was then added and stirring was continued for an additional 24 hours. The acylurea which had precipitated was removed by filtration and the peptide material was precipitated from the filtrate by addition of 250 ml. of ethyl acetate. The material collected by centrifugation was resuspended in ethyl acetate (100 ml.), recentrifuged and dried in vacuo over phosphorus pentoxide; yield 1.08 g. This product was dissolved in water (250 ml.) and the solution applied to a column of carboxymethylcellulose (3 x 21 cm.) which was successively eluted with the following pH 6.8 ammonium acetate buffers; 0.075 M (1500 ml.), 0.9 M (500 ml.), 0.15 M (1500 ml.) and finally 0.25 M (500 ml.). Individual fractions of 10 ml. each were collected at a flow rate of 5 to 6 ml. per minute. Absorbence at 280 mμ served to locate the peptides in the various chromatographic fractions. The desired material was located in the 0.15 M eluates (fractions 220 to 290). The contents of these tubes were pooled, the bulk of the solvent was removed in vacuo at a bath temperature of 40–50° and the concentrated solution was lyophilized. Ammonium acetate was removed by repeated lyophilization of the residue from small portions of water to constant weight; yield 463 mg. (49%); $[\alpha]_D^{28}$ −71.3° (c. 0.287 in 10% acetic acid); colorless fluffy powder, sharp single spot $R_f$ 0.44 (Partridge system); single component in paper electrophoresis in pyridinium acetate buffers of pH 6.5, 6.0, 5.1 and 3.8 and in collidinium acetate buffer at pH 7.0; amino acid ratios in acid hydrolysate $ser_{2.15}tyr_{2.08}met_{0.98}glu_{1.00}his_{1.05}phe_{1.10}arg_{2.89}$
$gly_{2.11}lys_{4.00}pro_{2.00}val_{2.87}$ (recovery 94%).

*Analysis.*—Calcd. for $C_{143}H_{219}O_{39}N_{41}S \cdot 8H_2O$: C, 51.8; H, 7.2; N. 17.3. Found: C, 51.6; H, 7.3; N, 17.5.

Essentially the same results were obtained when N,N'-carbonyldiimidazole was employed as the reagent for coupling (III) and (IV).

*Seryltyrosylserylmethionylglutamylhistidylphenylalanyl-arginyl tryptophyl glycyllysyl prolylvalyl glycyllysyllysyl-arginylarginylprolylvalyllysylvalyltyrosine* (I).—Each of five test tubes was charged with the protected tricosapeptide amide (II) (120 mg.), 0.5 N hydrochloric acid (8.5 ml.) and thioglycolic acid (0.2 ml.) and the tubes were immersed in a boiling water bath for 80 minutes. The tubes were cooled at room temperature, their contents pooled, diluted with water (20 ml.) and Amberlite IRA–400 in the acetate cycle was added with stirring until the solution was free of chloride ions (approximately 40 g. required). The resin was removed by filtration, was washed with four 30 ml. portions of water and the combined filtrate and washings were lyophilized to give a colorless fluffy powder (600 mg.) which possessed adrenocorticotropic activity (rat ascorbic acid depleting assay) of approximately 30 units per mg.

This material was dissolved in water (200 ml.) and the solution was applied to a CMC column (3 x 15 cm.) which was then eluted successively with the following ammonium acetate buffers: 0.075 M, pH 6.0 (1000 ml.), 0.225 M, pH 6.7 (750 ml.), 0.25 M, pH 6.8 (700 ml.), 0.25 M, pH 8.7 (800 ml.) and finally 0.3 M, pH 8.9 (500 ml.). Individual fractions (10 ml. each) were collected at a flow rate of 5 to 6 ml. per minute. The desired biologically active peptide was located in the 0.25 M, pH 8.7 eluates (fractions 262–315). The contents of these tubes were pooled and the solvent removed first in vacuo at a bath temperature of 40–50°, then by lyophilization. Ammonium acetate was removed by repeated lyophilization of the residue from small volumes of water to constant weight; yield 208 mg. (35%). Biological activity (rat ascorbic acid depletion assay) 103±10.4 units per mg. $R_f$ 1.18×histine with two minor impurities of $R_f$ 0.47 and 0.78×histidine respectively (system n-butanol 30, acetic acid 6, pyridine 20, water 24 by volume); $[\alpha]_D^{29}$—73.2° (c. 0.20 in 5% acetic acid); amino acid ratios in acid hydrolysate $ser_{1.7}tyr_{1.9}met_{0.8}glu_{0.9}his_{0.8}phe_{0.9}arg_{3.1}gly_{2.0}lys_{4.3}pro_{2.3}val_{3.4}$ (recovery 95%). Trace impurities can be removed from the peptide by electrophoresis on cellulose powder followed by CMC chromatography. This further purification had no measurable effect on biological activity. Amino acid ratios by microbiological assay $ser_{2.06}gly_{1.15}his_{0.93}phe_{1.13}arg_{2.94}lys_{3.06}pro_{2.02}val_{3.15}$.

The tricosapeptide amide (I) has been found to exhibit 103±10.4 I.U./mg. of both ascorbic acid depleting and plasma corticosterone elevating activity in vivo. Ascorbic acid depleting activity was determined in 24 hour hypophysectomized rats according to the method of U.S. Pharmacopoeia XV against the U.S.P. reference standard. The plasma corticosterone levels were determined 15 minutes following administration, Guillemin et al., Endocrinol 63, 349 (1958). The free steroid was separated chromatographically and assayed by a modification of the method of Kalant, Biochem. J. 69, 93 (1958).

We claim:

1. Seryl - tyrosyl - seryl - methionyl - glutamyl - histidyl - phenylalanyl - arginyl - tryptophyl - glycyl - lysyl-prolyl - valyl - glycyl - lysyl - lysyl - arginyl - arginyl-prolyl-valyl-lysyl-valyl-tyrosine amide.

2. N - acetylseryl - tyrosyl - seryl - methionyl - glutaminyl - histidyl - phenylalanyl - arginyl - tryptophyl-glycine.

3. $N^\epsilon$ - formyllysyl - prolyl - valyl - glycyl - $N^\epsilon$ - formyl-lysyl - $N^\epsilon$ - formyllysyl - arginyl - arginyl - prolyl - valyl-$N^\epsilon$-formyllysyl-valyl-tyrosyl amide.

References Cited by the Examiner

Bell et al.: J.A.C.S. vol. 78, pp. 5059–5067 (1956).
Greenstein et al.: Chemistry of the Amino Acids, vol. 2, John Wiley & Sons (1961) (pp. 804, 887, 949).
Hofmann et al.: J.A.C.S. vol 83, pp. 487–489 (Jan. 20, 1961).
Li, C. H., Advances in Protein Chem., vol. XI ed., by Anson et al., Academic Press (1956) (pp. 155, 162–165, 179, and 182–183).
Li et al.: J.A.C.S., vol. 82, pp. 5760–5762 (1960).

LEWIS GOTTS, *Primary Examiner.*

LEON ZITVER, JAMES A. SEIDLECK, DENNIS P. CLARKE, J. M. DULIN, PERRY A. STITH,
*Assistant Examiners.*